Patented July 3, 1951

2,558,764

UNITED STATES PATENT OFFICE 2,558,764

PROCESS FOR THE RECLAMATION OF RUBBER IN THE PRESENCE OF α,α-DIALKYL-ARYLMETHYL HYDROPEROXIDE

John R. Lewis, Wilmington, Del., assignor to Hercules Powder Company, Wilmington, Del., a corporation of Delaware No Drawing. Application June 30, 1948, Serial No. 36,278

11 Claims. (Cl. 260—2.3)

This invention relates to a process for treating rubber materials and, more particularly, to a process for the reclamation of vulcanized natural or synthetic rubber materials.

It is the purpose of a reclaiming process to restore to vulcanized rubber the characteristics of the unvulcanized material in so far as possible. The art of reclaiming natural rubber is well established. The commercial processes practiced depend primarily upon the use of heat, customarily in conjunction with water or steam and swelling or softening agents, such as terpene hydrocarbons, coal tars, and pine tars. These processes are not entirely adaptable to the reclamation of the synthetic rubbers for the reason that the heat employed serves to harden rather than to soften the synthetic materials involved. This hardening effect is a consequence of the further polymerization which is induced when the synthetic rubber molecule is heated. Various polymerization inhibitors have been suggested and utilized in conjunction with known swelling and softening agents in an effort to effect a satisfactory reclamation of synthetic rubber materials. These efforts have been largely unsuccessful.

Synthetic and natural rubber compositions when treated with conventional swelling agents rapidly revert substantially to their unswollen condition. This feature is particularly disadvantageous in that it necessitates an expeditious utilization of the swollen material. Furthermore, rubber materials treated with prior art swelling agents are undesirable for the reason that they develop and retain no appreciable surface tack. Accordingly, a significant problem in the art has been the formulation of rubber reclaiming agents which produce substantially permanently swollen materials which are characterized by a high degree of surface tack.

Now in accordance with the invention it has been discovered that partially or wholly vulcanized natural or synthetic rubber materials may be treated with an organic hydroperoxide to produce superior reclaimed rubber compositions. These reclaimed rubber compositions do not rapidly revert to their original unswollen state as do similar compositions of the prior art. On the contrary, they remain substantially swollen even after a period of six weeks' drying at room temperature. Furthermore, reclaimed rubber compositions formulated from these organic hydroperoxides develop an appreciable surface tack which is likewise retained after six weeks' drying. In these respects, the reclaimed rubber compositions prepared from organic hydroperoxides with which this invention is concerned are novel and represent a significant advance in the art.

In addition to the features hereinbefore discussed, these novel reclaimed rubber compositions are characterized by other desirable qualities, such as greatly improved milling characteristics and greater softness as compared with those known to the prior art. Furthermore, these desirable characteristics are imparted to the rubber compositions into which the reclaimed materials are ultimately incorporated.

The process in accordance with this invention may be carried out by the heating of vulcanized natural or synthetic rubber with an α,α-dialkylarylmethyl hydroperoxide composition. Either the monohydroperoxide compositions or dihydroperoxide compositions of this type may be utilized.

The α,α-dialkylarylmethyl hydroperoxides used in accordance with this invention have the following structural formula

in which $R_1$ and $R_2$ represent alkyl groups, Ar represents a substituent selected from the group consisting of aryl and alkaryl groups and X represents the hydroperoxy (—OOH) group. As illustrative of the alkyl-substituted aromatic organic compounds which may be oxidized, p-cymene, cumene, and diisopropylbenzene may be mentioned. These compounds lead to α,α-dimethyl-p-methylbenzyl, α,α-dimethylbenzyl, and α,α-dimethyl-p-isopropylbenzyl hydroperoxides, respectively. Also in the case of diisopropylbenzene there may be obtained α,α,α',α'-tetramethyl-p-xylylene dihydroperoxide. These compounds also may be named as aryl(dialkyl)methylhydroperoxides; for example, α,α-dimethylbenzyl hydroperoxide may be designated as phenyl(dimethyl)methyl hydroperoxide. The aryl and alkaryl groups need not be derived from benzene, as is the case in the afore-mentioned compounds, for compounds containing aromatic nuclei derived from naphthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, secondary butyl, tertiary butyl, and the like, to give alkaryl substituents, the same alkyl groups also being representative of $R_1$ and $R_2$ in the structural formula. $R_1$ and $R_2$ may be either the same or different. These organic hydroperoxides may be employed either alone or in conjunction with one or more of the conventional swelling or softening agents known to the art. The reclamation process may be carried out in an alkaline, neutral, acid medium. The hydroperoxides of this invention are especially beneficial in obviating those difficulties which attended the prior art methods of reclaiming synthetic rubber materials.

Having thus indicated in a general way the nature of this invention, the following examples are offered as specific embodiments thereof. The Solvenol referred to in these examples and elsewhere herein is a terpene solvent, a typical analysis of which is as follows: specific gravity, 0.8587/15.6° C.; refractive index, 1.4770/20° C.; distillation range, 177°–195° C.; α-pinene, 12%; dipentene, 36%; α-terpinene, 5%; p-menthane, 10%; terpinolene, 23%; p-cymene, 14%. All parts are by weight unless otherwise indicated.

Example I

Solvenol and a mixture containing 50% Solvenol and 50% of an α,α-dimethylbenzyl hydroperoxide composition were tested as swelling agents. The α,α-dimethylbenzyl hydroperoxide composition was the reaction product prepared by the air oxidation of cumene and contained 42% of the hydroperoxide and 58% of α,α-dimethylbenzyl alcohol, acetophenone, and other secondary reaction products. Vulcanized Buna S (butadiene-styrene copolymer-type synthetic rubber) and vulcanized natural cured rubber were employed.

The experiment was carried out by submerging in 1" x 8" test tubes 0.075" x 0.25" x 3" strips of the respective rubbers in the swelling agents to be tested. The test tubes were then heated at a temperature of 100° C. in a steam bath for 8 days. The lengths of the specimens were determined by laying the test tube on a sheet of graph paper. After the rubber specimens had been in the solvents for eight days, they were removed, blotted, and allowed to dry, under observation, for six weeks under conditions of 50% relative humidity at a temperature of 25° C.

Both the natural and synthetic rubber samples clearly demonstrated the superior effects of the mixture of Solvenol and α,α-dimethylbenzyl hydroperoxide over Solvenol alone. However, a distinct and novel advantage attended the samples treated with the mixture containing the hydroperoxide. Whereas the specimens swollen with Solvenol No. 1 rapidly returned to essentially their original condition, those swollen with the mixture containing the hydroperoxide retained a substantial amount of the original swelling after six weeks' drying and, unlike the Solvenol-softened strips, became tacky on the surface and remained so throughout the six weeks' period.

Example II

Natural whole tire scrap rubber was subjected to a typical reclaiming process as follows: 200 g. of commercially ground scrap rubber was placed in a closed container under nitrogen at atmospheric pressure together with a solution of 25 g. of sodium hydroxide dissolved in 500 to 600 g. water and 12 ml. of a reclaiming agent. With the system closed, the temperature was increased to 200° C. and held at this point for 24 hours. The digested scrap was then washed on a Buchner funnel until the wash water was neutral. The reclaim was finally washed on corrugated 6" x 12" rubber rolls. An α,α-dimethyl-p-methylbenzyl hydroperoxide composition and Solvenol were tested as reclaiming agents. The reclaimed product formed in the presence of α,α-dimethyl-p-methylbenzyl hydroperoxide was softer and a generally superior product as compared with that resultant from the use of Solvenol. The α,α-dimethyl-p-methylbenzyl hydroperoxide composition was the reaction product prepared by the air oxidation of p-cymene and contained 33.3% of the hydroperoxide and 66.7% of α,α-dimethyl-p-methylbenzyl alcohol, p-methyl acetophenone, and secondary reaction products.

Example III

Neoprene (polymerized 2-chloro-1,3 butadiene) tread stock was subjected to the same reclamation process as that described in Example II. The α,α-dimethyl-p-methylbenzyl hydroperoxide reclaimed product again was much softer and characterized by markedly superior qualities as compared with the Solvenol product.

Example IV

Buna S was subjected to the same reclaiming process as that described in Example II. The following reclaiming agents were tested: (1) α,α-dimethyl-p-methylbenzyl hydroperoxide composition, (2) p-cymene, (3) Solvenol, (4) a mixture containing 50% α,α-dimethyl-p-methylbenzyl hydroperoxide composition and 50% p-cymene, and (5) a mixture containing 50% Solvenol and 50% α,α-dimethyl-p-methylbenzyl hydroperoxide composition. Results were analogous to those obtained in Examples II and III. The α,α-dimethyl-p-methylbenzyl hydroperoxide composition used alone or in combination with the other hydrocarbons tested, demonstrated greatly superior properties as a reclaiming agent. The same α,α-dimethyl-p-methylbenzyl hydroperoxide composition as that employed in Example II was used.

Example V

The natural rubber reclaim specimens obtained as a product of the process described in Example II and a sample of commercial whole tire reclaim were tested by compounding in the following formula:

| | Parts by weight |
|---|---|
| No. 1 smoked sheets (crude natural rubber) | 108 |
| Reclaim | 120 |
| Zinc oxide | 7.5 |
| Channel carbon black | 53.1 |
| Stearic acid | 5.1 |
| Sulfur | 5.25 |
| Mercaptobenzothiazole | 1.05 |

The crude rubber was first milled for 30 minutes in a 500 g. batch on a 6" x 12" mill at a temperature of about 160° F. It was then divided for individual test compositions. The materials were incorporated as rapidly as possible in the order listed above with the rolls of the mill kept at a temperature of about 150° F. A thorough mixing was accomplished between the additions of the ingredients, followed by a final mixing achieved by cross-cutting and cross-rolling several times. After standing overnight, sheets 6" x 6" x 0.075" were vulcanized at 275° F. for 20, 30 and 45 minutes, respectively, and, after another overnight period, tensile data were obtained by standard rubber testing procedures.

The product resultant from the α,α-dimethyl-p-methylbenzyl hydroperoxide reclaim exhibited great tensile strength and was superior both to a corresponding compound containing a reclaimed material prepared with Solvenol alone and to one compounded with the commercial whole tire reclaim.

Example VI

Vulcanized natural rubber (tire tread stock) was treated with (1) p-cymene alone, (2) α,α-dimethyl-p-methylbenzyl hydroperoxide composition, and (3) a mixture containing 50% p-cymene and 50% α,α-dimethyl-p-methylbenzyl hydroperoxide composition. The α,α-dimethyl-p- methylbenzyl hydroperoxide composition was the same as that used in Example II.

A large aluminum kettle filled with a hydrocarbon oil was utilized for this test. This kettle was heated on a hot plate controlled by a Variac, by means of which a constant temperature of 100° C. ±3° C. was maintained. A wooden cover, in which were drilled 24 holes large enough for a one-inch test tube to pass through to the rim, was placed over the kettle. The vulcanized rubber samples (cut 0.075" x 0.5" x 2" long) to be tested were placed in one-inch diameter test tubes and suspended through the holes in the cover and into the oil vat. Two-foot lengths of glass tubing, placed through rubber stoppers inserted in the top of the test tubes, acted as air condensers and prevented evaporation of the liquid reagents.

The results of this experiment demonstrated clearly the superiority of the $a,a$-dimethyl-p-methylbenzyl hydroperoxide composition as a swelling agent for vulcanized natural rubber. Both the specimen treated with $a,a$-dimethyl-p-methylbenzyl hydroperoxide composition alone and the specimen treated with the mixture of $a,a$-dimethyl-p-methylbenzyl hydroperoxide composition and p-cymene were completely dissolved in one day, whereas the specimen treated with p-cymene alone demonstrated only a marked swelling.

*Example VII*

Vulcanized Buna S (butadiene-styrene copolymer-type synthetic rubber) was treated with (1) p-cymene, (2) $a,a$-dimethyl-p-methylbenzyl hydroperoxide composition, (3) Solvenol, (4) a mixture containing 50% p-cymene and 50% $a,a$-dimethyl-p-methylbenzyl hydroperoxide composion, (5) a mixture containing 50% Solvenol and 50% $a,a$-dimethyl-p-methylbenzyl hydroperoxide composition and (6) a mixture containing 50% p-cymene and 50% Solvenol. The $a,a$-dimethyl-p-methylbenzyl hydroperoxide composition was the same as that used in Example II.

The treatment was carried out in exactly the same manner as that described in Example VI. The $a,a$-dimethyl-p-methylbenzyl hydroperoxide composition when used as the sole reagent demonstrated the greatest swelling effect of any of the materials tested. In admixture with Solvenol and with p-cymene, $a,a$-dimethyl-p-methylbenzyl hydroperoxide composition also demonstrated superior swelling qualities as compared with those shown by either of the other two hydrocarbons alone or the mixture thereof.

*Example VIII*

The process described in Example VII was repeated with the exception that vulcanized neoprene (polymerized 2-chloro 1,3 butadiene) was substituted for vulcanized Buna S. Results were analogous with those obtained in Example VII. The $a,a$-dimethyl-p-methylbenzyl hydroperoxide composition, either alone or blended with Solvenol or p-cymene, was markedly superior as a swelling agent to either hydrocarbon alone or a blend of the two. The $a,a$-dimethyl-p-methylbenzyl hydroperoxide composition was the same as that used in Example II.

*Example IX*

Vulcanized butadiene-styrene copolymer-type synthetic rubber scrap and natural rubber scrap were subjected to typical neutral, acid and alkaline reclaiming processes. An $a,a$-dimethylbenzyl hydroperoxide composition and $a,a,a',a'$-tetramethyl-p-xylylene dihydroperoxide composition were used in these tests. The $a,a$-dimethylbenzyl hydroperoxide composition was employed in the same admixture with secondary reaction products as that utilized in Example I. The $a,a,a',a'$-tetramethyl-p-xylylene dihydroperoxide composition was likewise mixed with secondary reaction products. These hydroperoxide compositions were tested both alone and with either an auxiliary swelling agent, such as Solvenol, or a softening agent, such as pine tar oil, or both. The alkaline and neutral processes were carried out as follows: 60 g. of the rubber to be treated, 3–6 g. of the hydroperoxide reclaiming agent, and 200 g. of water were placed in a cylindrical Monel bomb. The bomb was filled with air at room pressure and rotated end-over-end for 16 hours in an oil bath held at 190° C. In some instances, 3 g. of Solvenol and/or 3 g. of pine tar oil were added to the mixture. In the case of the alkaline reclaiming process, 200 g. of aqueous sodium hydroxide was substituted for the 200 g. of water. After the reclaiming process was completed and the bombs had cooled to room temperature, the products were rinsed with running water. In the case of the alkaline mass, the reclaimed product was washed for about two hours.

In the acid process, similar amounts of ingredients were employed with the exception that 200 g. of aqueous zinc chloride solution was utilized, rather than the 200 g. of water. The process was carried out in a plain steel bomb agitated in an electrically heated rocker device. The same conditions of time and temperature were employed as in the case of the neutral and alkaline processes. The reclaimed product from the acid process was rinsed thoroughly, soaked in 5% sodium hydroxide solution, and finally washed for two hours in running water.

The masses of reclaimed rubber resultant from the various processes were dried on a 2" x 6" two-roll laboratory rubber mill at a temperature of 340° to 360° F. These reclaimed products were finally remilled at a lower temperature which was required to form a sheet of the reclaim. The sheets so formed were allowed to cool to room temperature.

The reclaimed rubber compositions derived from these processes all demonstrated superior qualities of tack, millability, and smoothness over those rubber reclaim compositions known to the prior art. The most desirable compositions were produced from the use of the organic hydroperoxides of this invention in conjunction with both an auxiliary swelling agent and an auxiliary softening agent.

As is evident from the above examples, the organic hydroperoxide compositions utilized in accordance with the process of this invention demonstrate marked superiority as reclaiming agents for both natural and synthetic rubber materials, whether used alone or in conjunction with auxiliary swelling and softening agents known to the prior art. Furthermore, the rubber reclaimed compositions resultant from the use of these hydroperoxide materials may be utilized to formulate vulcanizates of superior quality. Vulcanized natural and synthetic rubber materials become permanently swollen when treated with these hydroperoxide compositions and develop a surface tack which is also permanent. This is in particular contrast to the characteristics demonstrated by rubbers swollen with prior art softeners which rapidly revert essentially to their original condition.

The α,α-dialkylarylmethyl hydroperoxides with which this invention is concerned are operable in all of the typical acid, neutral, and alkaline rubber reclaiming processes known to the art. Suitable temperature ranges are those customarily utilized in such processes. A temperature range of from 100° C. to 200° C. is, however, preferred. The temperature employed must, of course, be below that at which actual rubber decomposition, as distinguished from devulcanization, occurs. Wide ranges of pressure may also be utilized.

The objects of this invention are accomplished by using α,α-dialkylarylmethyl hydroperoxide materials as rubber reclaiming agents. Such hydroperoxides may be prepared by the oxidation of alkyl-substituted aromatic organic compounds having the structural formula

in which $R_1$ and $R_2$ represent alkyl groups and Ar represents a substituent selected from the group consisting of aryl and alkaryl groups. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 25° C. and about 95° C. in the presence of an aqueous alkali. The concentration of the aqueous alkali may be between about 1% and about 35% although it is preferable to use concentrations of about 2% to about 8%. Vigorous agitation is desirable during the oxidation reaction. Although all of the organic hydroperoxides embraced by the structural formula previously mentioned are operable, α,α-dimethyl-p-methylbenzyl hydroperoxide, α,α-dimethylbenzyl hydroperoxide, α,α-dimethyl - p - isopropylbenzyl hydroperoxide, α,α,α',α'-tetramethyl-p-xylylene dihydroperoxide, α-ethyl-α-methylbenzyl hydroperoxide, α,α-dimethyl-p-ethylbenzyl hydroperoxide and α,α-dimethylnaphthylmethyl hydroperoxide are preferred.

In carrying out this invention the reclaiming agents comprising an α,α-dialkylarylmethyl hydroperoxide may be prepared using several different modifications of the hydroperoxide material. The hydroperoxide may be used, for example, either in the form of the pure hydroperoxide, or in the form of a crude reaction mixture containing the hydroperoxide and obtained by the oxidation with air or oxygen of an alkyl-substituted aromatic organic compound having the structural formula shown previously. When the hydroperoxide is obtained by such an oxidation, the oxidation usually is interrupted before all of the hydrocarbon has reacted in order to avoid or limit side reactions. In this manner the α,α-dialkylarylmethyl hydroperoxide is obtained in mixture with smaller or larger amounts of the original hydrocarbon, which is an α,α-dialkylarylmethane, and the mixture also may contain secondary reaction products such as the corresponding alcohols, which are α,α-dialkylarylmethyl alcohols. The oxidation of cumene, for example, leads to a reaction product containing α,α-dimethylbenzyl hydroperoxide, α,α-dimethylbenzyl alcohol, a small amount of acetophenone, and unchanged cumene. Such a reaction product may be used per se in forming the reclaiming agents of this invention. In case it is desirable, however, to obtain the hydroperoxide in a more concentrated form, the hydroperoxide may be separated from the other constituents of the crude reaction mixture. The hydroperoxides may be separated from the reaction mixtures by, for example, fractional distillation at very low pressures, of the order of 0.01 to 1.0 mm./sq. cm., the hydroperoxides having higher boiling points than the related hydrocarbon, alcohol and ketone. In some instances the hydroperoxides also may be separated from the oxidation reaction mixtures by crystallization, which may be facilitated by first distilling off at least part of the hydrocarbon. Steam distillation usually is sufficient to remove the hydrocarbon.

The organic hydroperoxides may be employed in amounts of from about 0.1% to about 50% of the weight of the rubber treated. The preferable amount will vary, depending upon the type of rubber which is to be reclaimed, the character of the auxiliary softening and swelling agents used, if any, and the properties desired in the final reclamation product. Preferably, the organic hydroperoxide will be employed in an amount equivalent to from about 0.5% to about 10% of the weight of the rubber treated. The synthetic rubber materials usually will require more of both the hydroperoxide and the auxiliary swelling and softening agents, if any are employed, than will natural rubber.

The customary swelling and softening agents may be employed in admixture with the organic hydroperoxides of this invention. As swelling agents, Solvenol, cymene, pine tar oil, dipentene, solvent naphtha, petroleum naphtha, dicyclopentadiene, process oils, and light fraction coal tars may, for example, be so utilized.

All the various softening agents known to the art may be used with the organic hydroperoxides of this invention. Typical operable softening agents are, among others, pine tar oil, pine tar, rosin, abietic acid, hydrogenated rosin, disproportionated rosin, pine oil, Para Flux (a polymerized saturated hydrocarbon still residue which is a viscous dark liquid, fluid at high temperatures and has a specific gravity of 1.03 and a Gardner-Holdt viscosity of 77 cp. at 100° C.), mineral rubber, coumarone resins, cottonseed oil, rosin oil, and coal tars (high boiling fractions). These reagents may be utilized either alone or in admixture in conjunction with the hydroperoxides of this invention. Those skilled in the art will be well cognizant of the proper quantities of the various reagents necessary to achieve the optimum results.

The various examples have shown the use of the organic hydroperoxides in the reclaiming of natural rubber, Buna S synthetic rubber (butadiene-styrene copolymer), and neoprene (polymerized 2-chloro-1,3 butadiene). The process of this invention may be applied, however, to the reclaiming of other synthetic rubber materials such as those prepared by polymerizing diolefins, halogenated derivatives of diolefins, or other substituted diolefins, or by copolymerizing diolefins with other compounds containing a vinyl group, such as styrene, acrylic acid esters, and acrylic acid nitrile. More specifically, the rubberlike polymers may be those obtained by polymerizing the conjugated butadiene hydrocarbons, butadiene and its derivatives, such as isoprene, dimethyl butadiene, and chloroprene, or by copolymerizing, for example, butadiene and styrene or acrylonitrile, or isoprene and styrene or acrylonitrile. The commercial synthetic rubbers to which the process of this invention is particularly applicable are, however, neoprene (polychloroprene) Buna S (butadiene-styrene copolymer), and Buna N (butadiene-acryonitrile copolymer).

Furthermore, the scrap rubber suitable for reclaiming may be derived from almost any source. For example, whole tires, tire treads, inner tubes, rubber hose, footwear, proof goods of various types, sanitary articles, toys, ornamental objects, mechanical goods, and similar articles, whether worn out in use or rejected as unsuitable for use, may be advantageously reclaimed in accordance with this invention. In addition, the scraps and "flash" from the molds employed in the production of natural or synthetic rubber articles and scorched or precured rubber stocks may be reclaimed by means of the organic hydroperoxides of this invention.

The reclaimed natural and synthetic rubber materials prepared in accordance with this invention are characterized by greatly improved millability, greater softness, greater building tack, and, when compounded into a new rubber composition, they impart thereto superior physical qualities, such as tensile strength. Accordingly, the reclaimed rubber compositions prepared by the process of this invention may advantageously be formulated into new articles of manufacture. The reclaimed compositions may be so utilized either alone or in combination with new natural rubber, new synthetic rubber, or with another reclaimed composition. In the case of synthetic materials, the reclaimed compositions may be formulated with new material of either the same or a different polymer. The conventional fillers, accelerators, activators, antioxidants, and vulcanization agents may, of course, be used in the quantity and manner well known to those skilled in the art. Thus, there may be prepared tire tread stocks, tire carcass stocks, inner tubes, wire coating, rubber hose, footwear, proof goods, electric insulator materials, sanitary articles, toys, ornamental objects, gaskets, and the like.

What I claim and desire to protect by Letters Patent is:

1. The process of reclaiming a vulcanized rubber material which comprises heating the rubber material in the presence of from about 0.1% to about 50% of its weight of a hydroperoxide which structurally is an aromatic hydrocarbon having attached to the ring thereof at least one but not more than two $\alpha,\alpha$-dialkyl-$\alpha$-hydroperoxymethyl groups.

2. The process of claim 1 wherein the hydroperoxide is $\alpha,\alpha$-dimethylbenzyl hydroperoxide.

3. The process of claim 1 wherein the hydroperoxide is $\alpha,\alpha$-dimethyl-p-methylbenzyl hydroperoxide.

4. The process of claim 1 wherein the hydroperoxide is $\alpha,\alpha,\alpha',\alpha'$-tetramethyl-p-xylylene dihydroperoxide.

5. The process of reclaiming a vulcanized rubber material which comprises heating the rubber material in the presence of a swelling agent, a softening agent, and a hydroperoxide which structurally is an aromatic hydrocarbon having attached to the ring thereof at least one but not more than two $\alpha,\alpha$-dialkyl-$\alpha$-hydroperoxymethyl groups, said hydroperoxide being employed in an amount of from about 0.1% to about 50% of the rubber material treated.

6. The process of reclaiming a vulcanized butadiene copolymer which comprises heating the vulcanized butadiene copolymer in the presence of a swelling agent, a softening agent, and a hydroperoxide which structurally is an aromatic hydrocarbon having attached to the ring thereof at least one but not more than two $\alpha,\alpha$-dialkyl-$\alpha$-hydroperoxymethyl groups, said hydroperoxide being employed in an amount of from about 0.1% to about 50% of the weight of the vulcanized butadiene copolymer treated.

7. The process of reclaiming a vulcanized rubber material which comprises heating the rubber material in the presence of from about 0.5% to about 10% of its weight of a hydroperoxide which structurally is an aromatic hydrocarbon having attached to the ring thereof at least one but not more than two $\alpha,\alpha$-dialkyl-$\alpha$-hydroperoxymethyl groups.

8. The process of reclaiming a vulcanized natural rubber which comprises heating the vulcanized natural rubber in the presence of from about 0.5% to about 10% of its weight of a hydroperoxide which structurally is an aromatic hydrocarbon having attached to the ring thereof at least one but not more than two $\alpha,\alpha$-dialkyl-$\alpha$-hydroperoxymethyl groups.

9. The process of reclaiming a vulcanized rubber material which comprises heating the rubber material in the presence of a softening agent and a hydroperoxide which structurally is an aromatic hydrocarbon having attached to the ring thereof at least one but not more than two $\alpha,\alpha$-dialkyl-$\alpha$-hydroperoxymethyl groups, said hydroperoxide being employed in an amount equivalent to from about 0.5% to about 10% of the weight of the rubber material treated.

10. The process of reclaiming a vulcanized rubber material which comprises heating the rubber material in the presence of a swelling agent and a hydroperoxide which structurally is an aromatic hydrocarbon having attached to the ring thereof at least one but not more than two $\alpha,\alpha$-dialkyl-$\alpha$-hydroperoxymethyl groups, said hydroperoxide being employed in an amount equivalent to from about 0.5% to about 10% of the weight of the rubber material treated.

11. The process of reclaiming a vulcanized rubber material which comprises heating the rubber material in the presence of from about 0.1% to about 50% of its weight of a hydroperoxide which structurally is an aromatic hydrocarbon having attached to the ring thereof one $\alpha,\alpha$-dialkyl-$\alpha$-hydroperoxymethyl group.

JOHN R. LEWIS.

REFERENCES CITED

The following references are of record in the file of this patent:

UNITED STATES PATENTS

| Number | Name | Date |
|---|---|---|
| 922,339 | Rouxeville | May 18, 1909 |
| 2,069,151 | Ioannu | Jan. 26, 1937 |
| 2,261,166 | Levin | Nov. 4, 1941 |
| 2,324,980 | Kilbourne | July 20, 1943 |
| 2,395,523 | Vaughan et al. | Feb. 26, 1946 |
| 2,403,772 | Vaughan et al. | July 9, 1946 |

OTHER REFERENCES

Warden, pages 432 and 435, India Rubber World, January 1945.

LeBeau, pages 59, 63–65, India Rubber World, April 1948.

Certificate of Correction

Patent No. 2,558,764　　　　　　　　　　　　　　　　　　　July 3, 1951

JOHN R. LEWIS

It is hereby certified that error appears in the printed specification of the above numbered patent requiring correction as follows:

Column 2, line 54, before the word "acid" insert *or*; column 5, lines 38 and 39, for "composion" read *composition*; column 9, lines 73 and 74, for "of the rubber" read *of the weight of the rubber*;

and that the said Letters Patent should be read as corrected above, so that the same may conform to the record of the case in the Patent Office.

Signed and sealed this 28th day of August, A. D. 1951.

[SEAL]

THOMAS F. MURPHY,
*Assistant Commissioner of Patents.*